United States Patent [19]
Dolan

[11] Patent Number: 5,386,590
[45] Date of Patent: Jan. 31, 1995

[54] APPARATUS AND METHOD FOR INCREASING DATA TRANSMISSION RATE OVER WIRELESS COMMUNICATION SYSTEMS USING SPECTRAL SHAPING

[75] Inventor: Michael G. Dolan, Orange, Calif.

[73] Assignee: Celeritas Technologies, Ltd., Mission Viejo, Calif.

[21] Appl. No.: 99,080

[22] Filed: Jul. 28, 1993

[51] Int. Cl.$^6$ ............................................... H04Q 7/00
[52] U.S. Cl. ............................ 455/33.1; 455/43; 455/93; 455/95; 375/9; 375/60
[58] Field of Search .................. 455/33.1, 43, 72, 93, 455/95; 375/5, 11, 51, 57, 60, 9; 379/98; 370/7

[56] References Cited

U.S. PATENT DOCUMENTS

| | | |
|---|---|---|
| 3,109,991 | 11/1963 | Ocko . |
| 3,111,635 | 11/1963 | Skov et al. . |
| 3,444,469 | 5/1969 | Miyagi . |
| 3,517,314 | 6/1970 | Miyagi . |
| 3,962,638 | 11/1973 | Sallis . |
| 4,042,085 | 8/1976 | Errico . |
| 4,051,438 | 9/1977 | Pickett et al. . |
| 4,053,717 | 10/1977 | Snider . |
| 4,110,692 | 8/1978 | Pradel . |
| 4,215,431 | 7/1980 | Nady . |
| 4,481,547 | 11/1984 | Sato . |
| 4,578,818 | 3/1986 | Claydon . |
| 4,754,230 | 6/1988 | Schwartz et al. . |
| 4,802,236 | 1/1989 | Walczak et al. . |
| 4,860,336 | 8/1989 | D'Avello et al. . |
| 4,893,349 | 1/1990 | Eastmond et al. . |
| 4,907,087 | 3/1990 | Schreiber . |
| 5,058,202 | 11/1991 | Leveque . |
| 5,127,041 | 6/1992 | O'Sullivan . |
| 5,168,516 | 12/1992 | Ito . |
| 5,204,970 | 4/1993 | Stengel et al. . |
| 5,214,641 | 5/1993 | Chen et al. . |
| 5,226,178 | 7/1993 | Eastmond et al. . |
| 5,257,397 | 10/1993 | Barzegar et al. . |
| 5,297,192 | 3/1994 | Gerzberg . |

FOREIGN PATENT DOCUMENTS 4-68923 3/1992 Japan .
4-77125 3/1992 Japan .

OTHER PUBLICATIONS

OKI Electric Industry Co., Ltd. (Japan): "Proposal for Modem Evaluation System over Cellular Radio Links," CCITT Study Group XVII, Delayed Contribution D 137, Geneva, Oct. 29–Nov. 6, 1991, pp. 1–4.

Article entitled "Performance Testing of Cellular Modems", by Mike Mukund and Fred Mohajer, from Test & Measurement World, dated Jan. 1993, pp. 63, 64, 66, 68 and 69.

Telebit Corporation: "The Static Characteristics of Analog Cellular Radio Channels and Their Effects Upon Data Transmission," CCITT Study Group XVII, Delayed Contribution D 136, Geneva, Oct. 29–Nov. 6, 1991, pp. 1–11.

EIA Interim Standard, "Recommended Minimum Standards for 800–MHZ Cellular Subscriber Units," EIA/IS–19–B, May 1988.

Primary Examiner—Reinhard J. Eisenzopf
Assistant Examiner—Andrew Faile

[57] ABSTRACT

A system and method for reducing amplitude distortion in a data signal transmitted through a cellular analog communication system is embodied in several forms. Each specific embodiment of the invention eliminates distortion caused by clipping or sluggish recovery time induced by a limiter circuit which exists in conventional cellular communication systems. In one embodiment, pre-emphasis and de-emphasis functions of the cellular system are offset by complementary de-emphasis and post-emphasis circuits so that the high frequency components of the data signal are not clipped by the limiter. In another embodiment, the limiter circuit is bypassed selectively when a data signal is transmitted. In an alternative embodiment, a pilot tone is combined with the incoming data signal. The characteristics of the pilot tone are such that amplitude of the pilot tone is constant and always sets the gain of the limiter, thereby keeping the gain of the limiter circuit constant.

2 Claims, 9 Drawing Sheets

APPARATUS AND METHOD FOR INCREASING DATA TRANSMISSION RATE OVER WIRELESS COMMUNICATION SYSTEMS USING SPECTRAL SHAPING

BACKGROUND OF THE INVENTION

Field of the Invention

The present invention relates to radio communication systems, and, more particularly, to an apparatus and method for increasing the data transmission rates within an analog cellular communication device.

Description of the Related Art

Radio communication systems have become an important part of the overall communications network in the private, business, and government sectors. Radio communications systems offer a number of significant advantages over wireline or other communications systems. Most significantly, radio communication technology provides substantially greater flexibility than wireline systems, which typically provide communication access at a single geographic location. However, present radio communications systems also have a number of significant limitations as well. Perhaps the most serious limitation to present radio communications systems is the limited amount of data which is able to be transmitted via radio communication.

Many radio frequency bands are presently used for wireless communication systems. For example, the cellular band, police, fire and military bands, business bands, etc. Although the present invention will be described with reference to the analog cellular communication band, it will be understood that the teachings of the present invention apply to all radio frequency transmission.

The limitations observed in the data transmission rate for radio communications systems is especially prevalent in analog cellular communication systems. While modems might appear to connect at a 9600 bit per second modulation rate, actual throughput has typically been achieved at only 200–400 characters per second (as opposed to 960 characters per second as a 9600 bps rate would suggest). The lower throughput exhibited in conventional systems is due to link layer errors and packet retransmission. For an example of the previously attainable bps modulation rates, see an article entitled "New Protocol For Cellular Transfers" published in Communications Weekly, dated Jul. 5, 1993.

Ideally, in order to make radio communication systems a viable alternative to wireline systems in the field of data communication, the data throughput rate over the radio frequency communication system should be at or near the data throughput rate obtainable in wireline systems. Presently, however, the data throughput rate for cellular and other radio frequency communication systems is significantly lower than the data throughput rates obtainable in wireline communication systems. Furthermore, although significant advances have been made to increase the maximum data transmission rate in analog cellular communication systems, the present maximum data transmission rate is well below that needed for certain data communication applications. Specifically, many graphic related data transmission applications require a bit rate in excess of 9,600 bits per second to be viable for commercial use or other important applications. For example, one application involving cellular data transmission uses a cellular modem to transmit graphic images to an emergency vehicle (such as a fire engine) so that, for example, the floor plan of a burning building, and other important information, can be accessed by emergency personnel while in transit. If the graphic information is transmitted at a rate that is too low, the information may not reach the emergency personnel in time to be useful. In addition to emergency applications, an increased data transmission rate is important to the implementation of systems wherein large data files are to be transmitted in a reasonable time and at a reasonable cost. For example, see an article entitled "Better Mobile Network Infrastructure Needed" published in COMPUTERWORLD magazine, dated Jun. 28, 1993. Thus, a plurality of applications exist whose circumstances necessitate increased data transmission rates in order for these communications systems to be viable.

SUMMARY OF THE INVENTION

The present invention provides an improved cellular communication system which increases the maximum available data transmission rate over wireless systems close to that available over conventional wireline systems (i.e., approaching 2,000 characters per second). The inventor has recognized a limitation in present analog cellular communication systems which impedes accurate data transmission utilizing certain commonly used modulation techniques. The present invention compensates for this limitation and provides significantly increased data transmission rates over and above the previously possible maximum data transmission rates.

One aspect of the present invention is an apparatus for increasing the data throughput rate in an analog radio communication system where the radio communication system includes a transmitter having a pre-emphasis function and a limiting function, and a receiver having a de-emphasis function. The apparatus of the present invention includes a de-emphasizer located at the input of the transmitter end. The de-emphasizer has spectral shaping characteristics which are substantially opposite the spectral shaping characteristics of the pre-emphasis function in the transmitter so that the de-emphasizer substantially cancels the effect of the pre-emphasis function in the transmitter. A post-emphasizer is located at the output of the receiver. The post-emphasizer has spectral shaping characteristics which are opposite the spectral shaping characteristics of the de-emphasizer function in the receiver so that the post-emphasizer substantially cancels the effect of the de-emphasizer function of the receiver.

Another aspect of the present invention is an apparatus that substantially eliminates amplitude distortion of data signals encoded as a combination of amplitude modulation together with phase modulation, frequency modulation, or multiple frequencies transmitted within a radio communication system. The communication system includes a transmitter having a pre-emphasizer function and a limiting function, and further includes a receiver having a de-emphasizing function. The transmitter transmits signals to the receiver. The apparatus of the present invention comprises a de-emphasizer located at the transmitter that spectrally shapes the data signals and provides the spectrally shaped data signals as inputs to the transmitter to be transmitted to the receiver. A post-emphasizer located at the receiver receives signals from the receiver and spectrally shapes the received signals to reproduce the data signals.

Another aspect of the present invention is a method for eliminating amplitude distortion of data signals having information encoded as a combination of amplitude modulation together with phase modulation, frequency modulation, or multiple frequencies. The encoded data signals are transmitted within a radio communication system that includes a transmitter having a pre-emphasis function and a limiting function and a receiver having a de-emphasis function. The method includes the steps of spectrally shaping the data signal before inputting the data to the transmitter to offset spectral shaping performed by the pre-emphasis function in the transmitter. The method further includes the step of spectrally shaping the data signal to offset the spectral shaping performed by the de-emphasis function in the receiver.

Another aspect of the present invention is a method for increasing the throughput rate of data information transmitted over an analog radio communication system having a transmitter and a receiver. The transmitter has a pre-emphasis function and a limiting function and the receiver has a de-emphasis function. The method includes the steps of determining whether voice or data is being transmitted, and enabling a limiter compensation function if data is being transmitted. The limiter compensation function operates to cause the effective gain of the limiter function in the transmitter to be constant.

Another aspect of the invention is a method for increasing the throughput rate of data information transmitted over an analog radio communication system having a transmitter and a receiver, wherein the transmitter has a pre-emphasis function and a limiting function and the receiver has a de-emphasis function. The method includes the step of signal processing the data information to produce an output signal at the receiver which is substantially the same as a signal which would be present at the receiver if the effective gain of the limiting function were constant.

Another aspect of the present invention is a method for increasing the throughput rate of data information transmitted over an analog radio communication system having a transmitter and a receiver, wherein the transmitter has a pre-emphasis function and a limiting function and the receiver has a de-emphasis function. The method includes the step of bypassing the limiting function when the transmitted information is data.

Another aspect of the present invention is an apparatus for increasing the throughput rate of data information transmitted over an analog radio communication system having a transmitter and a receiver, wherein the transmitter has a pre-emphasis function and a limiting function and the receiver has a de-emphasis function. The apparatus includes a limiter compensation function which maintains the gain of the limiting function constant when the information transmitted over the radio communication system is data information.

Another aspect of the present invention is an apparatus for increasing the throughput rate of data information transmitted over an analog radio communication system having a transmitter and a receiver, wherein the transmitter has a pre-emphasis function and a limiting function and the receiver has a de-emphasis function. The apparatus includes a de-emphasizer located at the transmitter which cancels the effect of said pre-emphasis function within the transmitter which is enabled when data is transmitted over the communication system. The apparatus further includes a post-emphasizer located at the receiver which cancels the effect of the de-emphasis function within the receiver which is enabled when data is transmitted over the communication system.

Another aspect of the present invention is an apparatus for reducing amplitude distortion in data signals transmitted via a radio communication system that communicates both voice and data signals, wherein the communication system includes a transmitter having a pre-emphasis function and a limiting function, and includes a receiver having a de-emphasis function. The transmitter transmits signals to the receiver. The apparatus includes a pilot signal generator that generates a constant amplitude, constant frequency pilot tone, and a combiner circuit that combines said data signal with said pilot tone to form a composite signal having a data component and a pilot component. The composite signal is provided as an input to the transmitter such that the gain of the limiting function in the transmitter is maintained constant due to the pilot component of the composite signal. The apparatus further includes a filter that receives a receiver output signal from the receiver and that filters out the pilot component of the composite signals received by the receiver from the transmitter. Preferably, the filter is a notch filter having a notch at the frequency of the pilot tone.

DETAILED DESCRIPTION OF THE INVENTION

The inventor of the present system and method has recognized a limitation in conventional cellular voice communication systems which severely restricts the data bit rate capacity of an ordinary cellular communications channel. The problem which limits the data transmission rate of current cellular systems, as well as the general solution provided by the teachings of the present invention, will be outlined and discussed with reference to FIG. 1.

Figure 1:
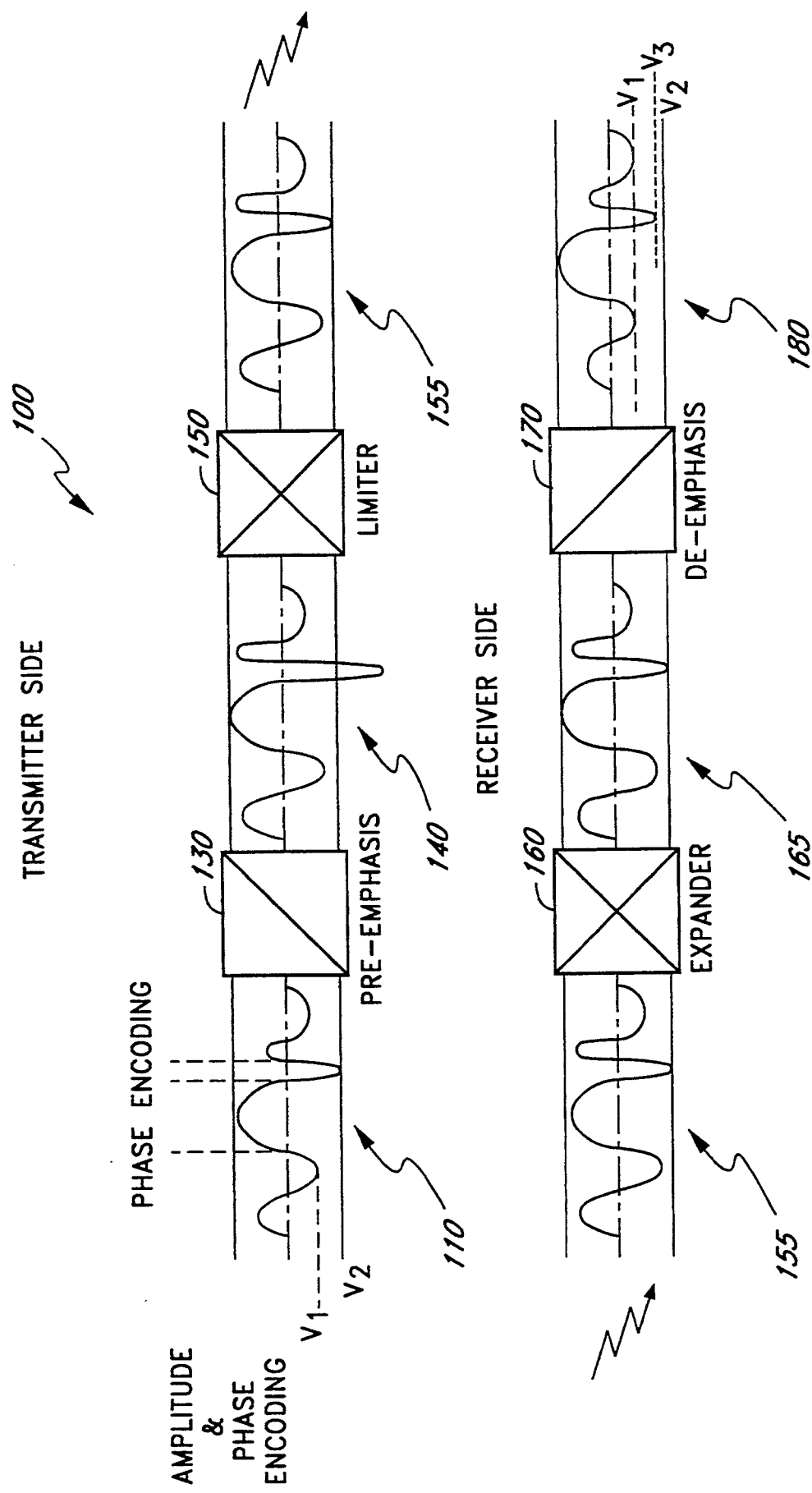
FIG. 1 is a system block diagram schematically showing the waveforms and functional system blocks associated with a conventional analog cellular communication system.

FIG. 1 is a diagram which represents data communication signals during different stages of transmission within a conventional analog cellular communication system 100. As shown in FIG. 1, in order to maximize data carrying capacity, a data transmission signal 110 is typically encoded with information by means of both amplitude and frequency or phase modulation techniques. As is well known in the art, this technique is called quadrature amplitude modulation (QAM). Although the signal 110 is described as a phase encoded signal, it should be understood that the present invention applies to amplitude modulated signals which are simultaneously encoded onto multiple different carrier frequencies as well. Thus, references to amplitude and phase modulation may also be understood to refer to amplitude and other combinations of frequency, phase, or multiple carrier frequency modulation techniques. A number of QAM modulation techniques are currently used such as V.32, V.32 bis, V.29, and others which modulate on the basis of both phase and amplitude. These amplitude values and phase differences are interpreted as data bits (i.e., binary "1's" or "0's"). It should be understood that the signal 110 is simplified for ease of illustration, and may not correspond to an actually encoded data signal used in present modulation techniques. Furthermore, data scrambling techniques are typically employed in conjunction with most high capacity data modulation techniques, so that any given waveform would not always represent the same bit pattern.

Common to most high capacity data modulation techniques is the combination of phase and amplitude modulation. In some of the more recent data transmission protocols several bits may be encoded by means of amplitude modulation. For example, in Packetized Ensemble Protocol (PEP) modulation, which allows a data transmission rate of up to 23,000 bits per second, a technique is employed wherein as many as 512 separate carriers are used simultaneously during data transmission and up to seven amplitude levels are also defined for each carrier frequency as a means to encode data. Thus, when employing such high capacity data transmission protocols, it is important to provide accurate amplitude detection at the receiving end. A failure to accurately discriminate voltage amplitude levels in these systems results in unacceptable bit error rates. It has been found by the inventor of the present system and method, that conventional analog cellular communication systems operate in a manner that distorts the amplitude element of data signals and thereby impairs the utilization of high data capacity protocols.

Conventional analog cellular communication systems are designed to transmit voice information over radio frequency channels. In order to reduce the effects of noise during communication, these systems include pre-emphasis and de-emphasis functions at the transmitting and receiving ends, respectively. Typically, interference due to noise in voice communication is experienced as a hiss in the high frequency band. Therefore, in order to increase the signal-to-noise ratio in this frequency range, the signal to be transmitted is pre-emphasized at the high frequency range, and is later de-emphasized in the same frequency spectrum at the receiving end. This pre-emphasis technique results in a reduction of high frequency noise, and therefore an improvement in voice quality.

FIG. 1 shows the main spectral shaping steps performed during transmission of a data signal. The data signal 110, which is encoded by means of both amplitude and phase modulation, initially enters a pre-emphasizer 130. As depicted in FIG. 1, the signal 110 is amplitude and phase encoded by distinct quantities so that there are no ambiguous voltage levels or phase shifts. The pre-emphasizer 130 amplifies the high frequency component of the signal 110 to produce an output signal 140. The pre-emphasized signal 140 enters a compressor or limiter 150. In many cellular communication systems, the compressor or limiter 150, together with an expander circuit 160, comprises a compander circuit which has a variable gain for compression and subsequent expansion of the dynamic range of the signal 140. The function of limiting may be performed by the compander or by external circuitry. For purposes of the following description the limiter 150 should be understood to perform the combined functions of limiting and compression. In order to meet the requirements of the cellular industry standard, the limiter 150 typically has a 2:1 compression factor, as is well understood in the art.

The limiter 150 performs a dual function as described herein. First, the limiter 150 provides dynamic range compression to increase the signal to noise ratio of low voltage signals, as is well known in the art. Second, the limiter 150 is provided to compensate for signals having amplitudes that exceed established threshold levels. When a data signal is modulated onto a carrier frequency in an FM analog cellular system, the amplitude of the data signal is encoded as variations in the carrier frequency. The larger the signal amplitude is, the greater the frequency variation. Because each channel of the cellular system has an assigned frequency bandwidth, it is important that the carrier signal not exceed this bandwidth so that interference with neighboring signals is avoided. Therefore, cellular communication systems must insure that the amplitude of the signal to be transmitted is below a given amplitude. Due to the large and sudden variations typically observed in voice communication, conventional cellular communication systems include a limiter function (sometimes called a compression amplifier). The limiter circuit 150 is provided so that when, for example, a person suddenly shouts, the amplitude of the signal to be transmitted does not exceed the allowed amplitude threshold (in this case V2). The limiter circuit 150 detects the voltage level of the incoming signal 140 and adjusts its own gain to reduce the amplitude of the signal 140 so that an output signal 155 has a maximum output voltage which is less than or equal to the allowed threshold amplitude. Thus, the high frequency components of the data signal 140 which were pre-emphasized to an amplitude above the threshold voltage V2 are limited, or clipped, as shown in the output signal 155. The effect of the limiter circuit 150 is substantially imperceptible in voice communication, but significantly impairs the usability of the cellular system for data transmission.

The dual function of the limiter 150 may be accomplished by a number of different circuit schemes which typically involve limiting by means of compression, clipping, or the like. However, the overall amplitude distortion effect of the limiter 150 remains essentially the same for the various implementations of the limiter 150, so that the teachings of the present invention are applicable universally to substantially all such implementations of the limiter circuit 150.

Although not represented in the output signal 155 shown in FIG. 1, the limiter 150 has a nominal attack time of 3 ms and recovery time of 13.5 ms, as mandated by industry standard. Therefore, if the gain of the limiter circuit 150 is continuously changing, significant amplitude distortion may occur in the data signals immediately following (i.e., within 13.5 ms) a sudden change of limiter gain. Therefore, it is desirable to maintain a nearly constant limiter gain.

Once the signal 155 leaves the limiter 150, the signal 155 is modulated onto the carrier signal (not represented in FIG. 1), and transmitted to a receiver having the expander circuit 160. The expander circuit 160 performs complementary operations to the limiter 150. That is, the expander 160 increases the dynamic range of the signal 155 by an expansion factor of 2:1, as is well known in the art. As can be seen in an output signal 165, however, the expander 160 does not compensate for the clipped high frequency portion of the signal 155, so that the high frequency component of the signal 165 remains clipped at the threshold voltage. The signal 165 enters a de-emphasizer circuit 170.

The de-emphasizer 170 attenuates the high frequency components of the signal 165 to output a received signal 180. As can be seen from the results of the transmission, the amplitude component of the original signal 110 has been distorted so that a high frequency component of the signal 180 has an ambiguous voltage amplitude V3. Because the receiving modem evaluates the amplitude of the signal 180 to determine part of the bit pattern encoded by the signal 180, a distortion in this amplitude resulting in an ambiguous voltage level may result in an erroneous bit detection, or modem malfunction. Thus, using the conventional cellular communication system 100, when data is transmitted in a modulation format which depends upon accurate amplitude discrimination, errors in the encoded data bits result.

The primary difficulty observed in this system is that the limiter 150 has a variable gain which sometimes introduces severe amplitude distortion in the encoded data signal 110. Because the gain of the limiter 150 varies as a function of the amplitude of the input voltage, conventional amplification circuits are not able to compensate for the amplitude distortion introduced by the limiter 150. In accordance with the teachings of the present invention, several devices and methods are proposed for compensating for the amplitude distortion introduced by the limiter 150 during data transmission.

Figure 2:
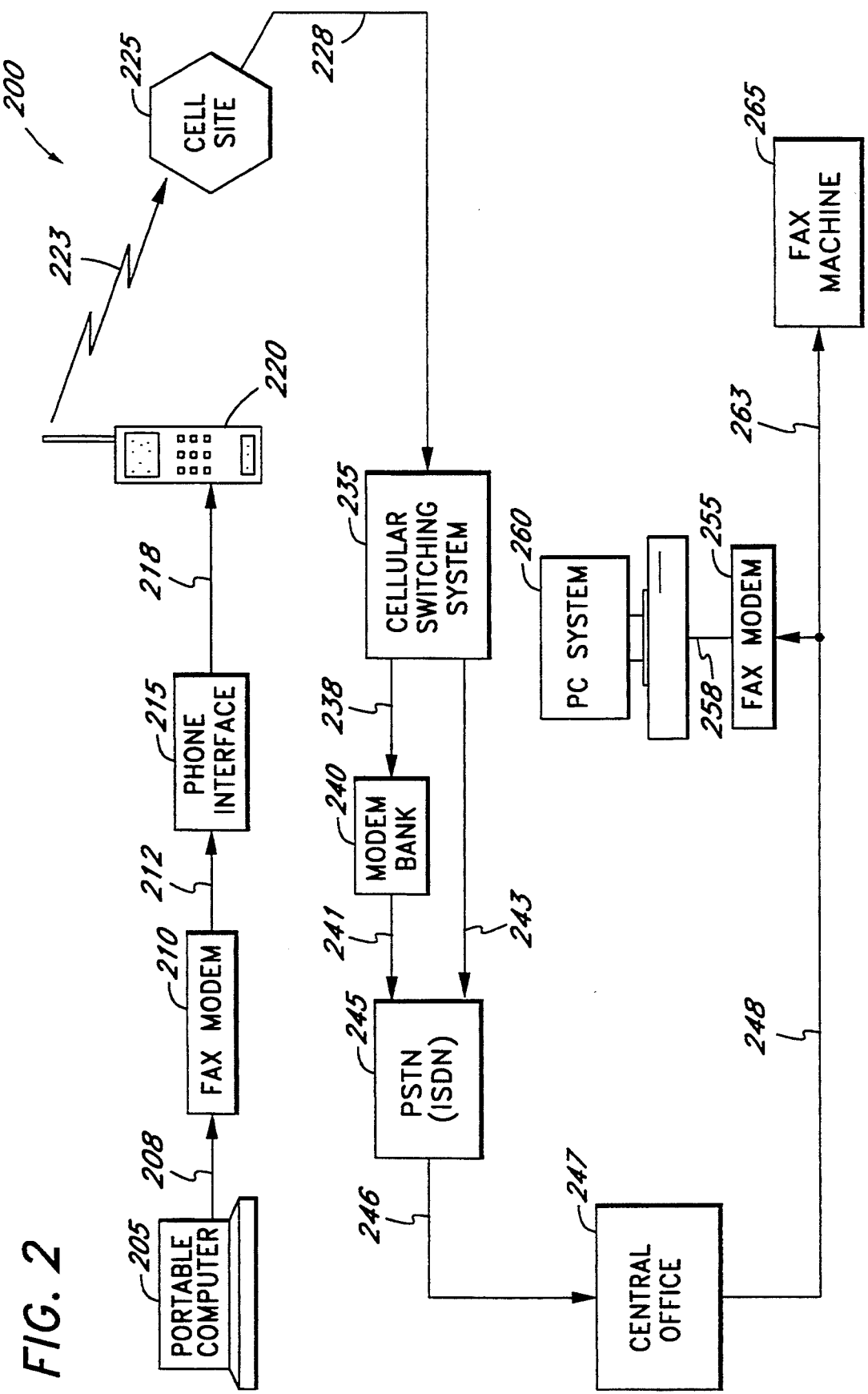
FIG. 2 is a simplified schematic diagram which represents most of the main structural elements of a conventional analog cellular communication system as connected during data transmission.

FIG. 2 is a simplified schematic diagram which represents most of the main structural elements of an analog cellular communication system 200. The cellular communication system 200 includes a portable computer 205 which may include a plurality of peripheral devices, such as a hard disk memory unit, a printer, etc. (not shown). In one embodiment, the computer 205 comprises an IBM PC compatible laptop computer. The computer 205 communicates with a FAX modem 210 via a communication link 208. The FAX modem 210 may, for example, be embodied as an AT&T Paradyne "Keep-in-Touch" modem, or a MICROCOM Microport modem. It will be appreciated by one of ordinary skill in the art that the FAX modem 210 may comprise a data modem, a FAX, or a combination of a FAX and data modem as well. The FAX modem 210 connects to a telephone interface 215 via a line 212. The telephone interface 215 may be embodied as a Cellular Connection interface, available from MOTOROLA. The interface 215 connects to a cellular telephone 220 via a link 218. The cellular telephone 220 may, for example, comprise a Micro-Tac cellular telephone, available from MOTOROLA.

The cellular telephone 220 communicates with a cell site 225 via radio transmission link 223. The cell site 225 includes receiving circuitry, such as a plurality of cellular radios (not shown) for acquiring voice or data information transmitted by the cellular telephone 220. The cell site 225 passes the acquired information to a cellular switching system 235 via a T-1 transmission link 228 which may, for example, comprise a land line or a microwave link. The cellular switching system 235 may connect directly to a modem bank 240 via a line 238, and then to a Public Switch Telephone Network (PSTN) 245 via a line 241. The cellular switching system 235 may either send information directly to the PSTN 245 via a line 243, or first send the information to the modem bank 240 which subsequently transfers the information to the PSTN 245 via a line 241.

The PSTN 245 communicates with a central office 247 via a communication link 246. The central telephone office 247 may perform certain upkeep and monitoring operations. The central telephone office 247 connects with a FAX modem 255 via line 248, or directly to a facsimile machine 265 via a line 263. As with the modem 210, the FAX modem 255 comprises an AT&T Paradyne "Keep-in-Touch" modem, or a MICROCOM Microport modem in one embodiment. Similarly, the FAX modem 255 may comprise a data modem, a FAX, or a combination of a FAX and data modem as well. The FAX modem 255 which may be a single modem (or a rack of modems) connects to a computer 260 via a communications link 258. The computer 260 also comprises one of a plurality of computers such as an IBM PC or Laptop computer, while the facsimile machine 265 may comprise a FUJITSU DEX 720, in one embodiment.

In operation, the cellular communication system 200 provides two way communication between the portable computer 205 and the computer 260. The computer 205 stores data files and executes programs. The computer 205 also has an appropriate interface protocol which allows for interface with the FAX modem 210. In one embodiment, the FAX modem 210 is internal to the computer 205, either by attachment to the motherboard, or by connection with the PCMCIA slot. In another embodiment, the modem 210 is external, and the RS 232 serial port is used to connect the computer 205 with the FAX modem 210. The FAX modem 210 converts digital data output by the computer 205 to analog data suitable for transmission over an analog cellular telephone communication link. The FAX modem 210 also converts incoming analog data into digital data suitable for input to the computer 205. The FAX modem 210 sends analog data to the telephone interface 215, which provides tip and ring functions to make the cellular telephone 220 appear like a regular telephone line (e.g., the interface 215 provides a dial tone, etc.).

The cellular telephone 220 includes radio transmitter circuitry including a pre-emphasis function and a limiter function such as those described in FIG. 1. The cellular telephone 220 transmits an analog data radio signal to a local cell site (i.e., the cell site 225). The cell site 225 receives the signal provided by the telephone 220 and transmits this signal to the cellular switching system 235 by means of a T-1 link which may be wireline or microwave. The cellular switching system 235 is a part of a mobile telephone switching office (MTSO), and performs channel routing functions, etc. During normal operation, the cellular switching system sends communication signals to the PSTN 245 via communication link 243. However, optionally, the cellular switching system 235 transfers communication signals to the modem bank 240, wherein modem and FAX data translation operations, as well as storage and forward functions may be performed. Once the communication signal is provided to the PSTN 245 by either the switching network 235 or the modem bank 240, the PSTN 245 transmits the communication signal in digital format to the central office 247. The central office 247 performs local call routing operations as well as performing digital to analog conversion. The communication signal is routed either to the modem 255 or directly to the facsimile machine 265. If the signal is transmitted to the modem 255, then the modem 255 transmits the signal to the computer 260 for further processing and display.

It should be noted that if voice information is to be communicated, the parties would simply use the telephone 220, and a telephone (not shown) connected on the receiving end. Furthermore, it should be understood that, although the data communication between the computer 205 and the computer 260 is described as unidirectional (from the computer 205 to the computer 260), the system 200 allows for bi-directional communication. Finally, one of ordinary skill in the art will recognize that either one side or both sides of the cellular communication system 200 can be embodied as a cellular transmitter/receiver. Thus, via the cellular communication system 200, binary data and other information can be transmitted from or to a computer and/or facsimile device by means of radio transmission.

In accordance with the present invention, compensation for amplitude distortion produced by the limiter 150 may be effected at a plurality of different locations along the cellular communication system 200, by several techniques. Each of the techniques used to compensate for the amplitude distortion produced by the limiter 150 ultimately look to the same end. Namely, to modify the communication signal or the limiter 150 so that the net effect of the limiter 150 is to produce a gain which remains constant throughout data transmission.

Figure 3:
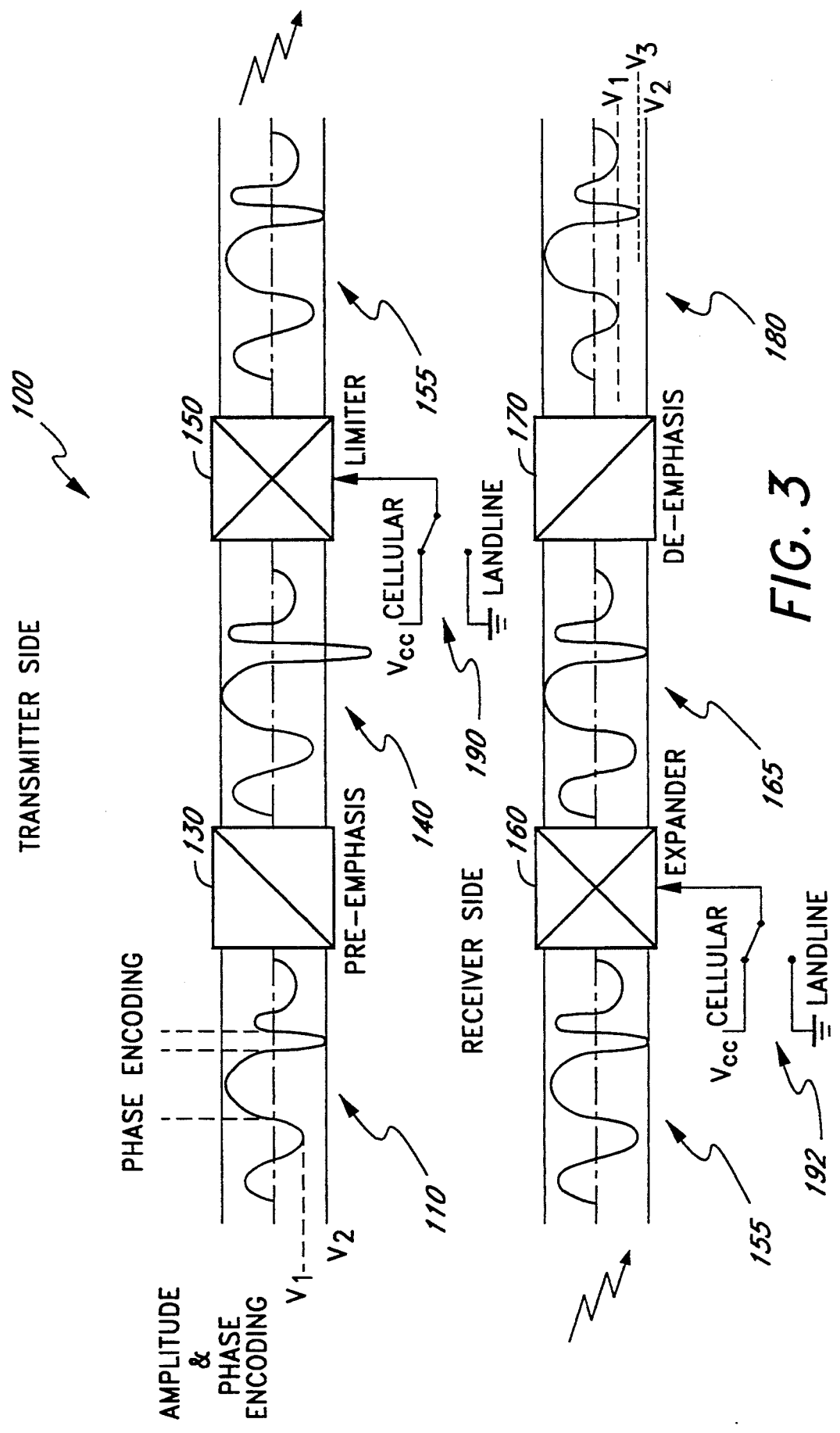
FIG. 3 is a system block diagram schematically showing the waveforms and functional system blocks associated with a cellular communication system which provides a limiter bypass mechanism in accordance with the teachings of the present invention.

The present invention is activated to maintain an effectively constant limiter gain. First, one embodiment of the present invention, shown in FIG. 3, responds (manually or automatically) to the detection of data information transmitted over radio frequency and activates disable or bypass circuits 190, 192 to bypass the limiter 150 and the expander 160, respectively. The limiter 150 is not needed during data transmission because the amplitude of the data signal is substantially constant throughout transmission. Of course, it may be necessary to insert a constant gain attenuation circuit into the bypass circuits 190, 192 in order to compensate for the high frequency amplification caused by the pre-emphasis circuit 130. A second way to accomplish substantially the same result is to set, or lock-in, the gain of the limiter circuit 150 to a constant level in response to a detection of an incoming data information signal. Although these are relatively straightforward solutions, it may be impractical to implement these solutions in some applications due to the requirement that the internal circuitry of the cellular telephone 220 be internally altered, and that the cell site 225 also be altered. This may pose significant problems since the current industry standard mandates a limiter circuit. Furthermore, because of the large quantities of existing cellular systems and because manufacturers or cellular network operators may not be willing to retroactively implement this change in all of their equipment and in customer cellular telephones, a preferred embodiment of the present invention, described below, can be used with existing systems without modifying the systems.

Alternatively, in another embodiment of the invention (not shown), only the limiting function of the limiter 150, and not the compression function of the limiter 150, is disabled by the bypass switch 190. In this alternative embodiment, the switch 192 in the receiver is not necessary because the expander 160 will still be used.

The De-emphasis/Post-emphasis Circuit

Figure 4:
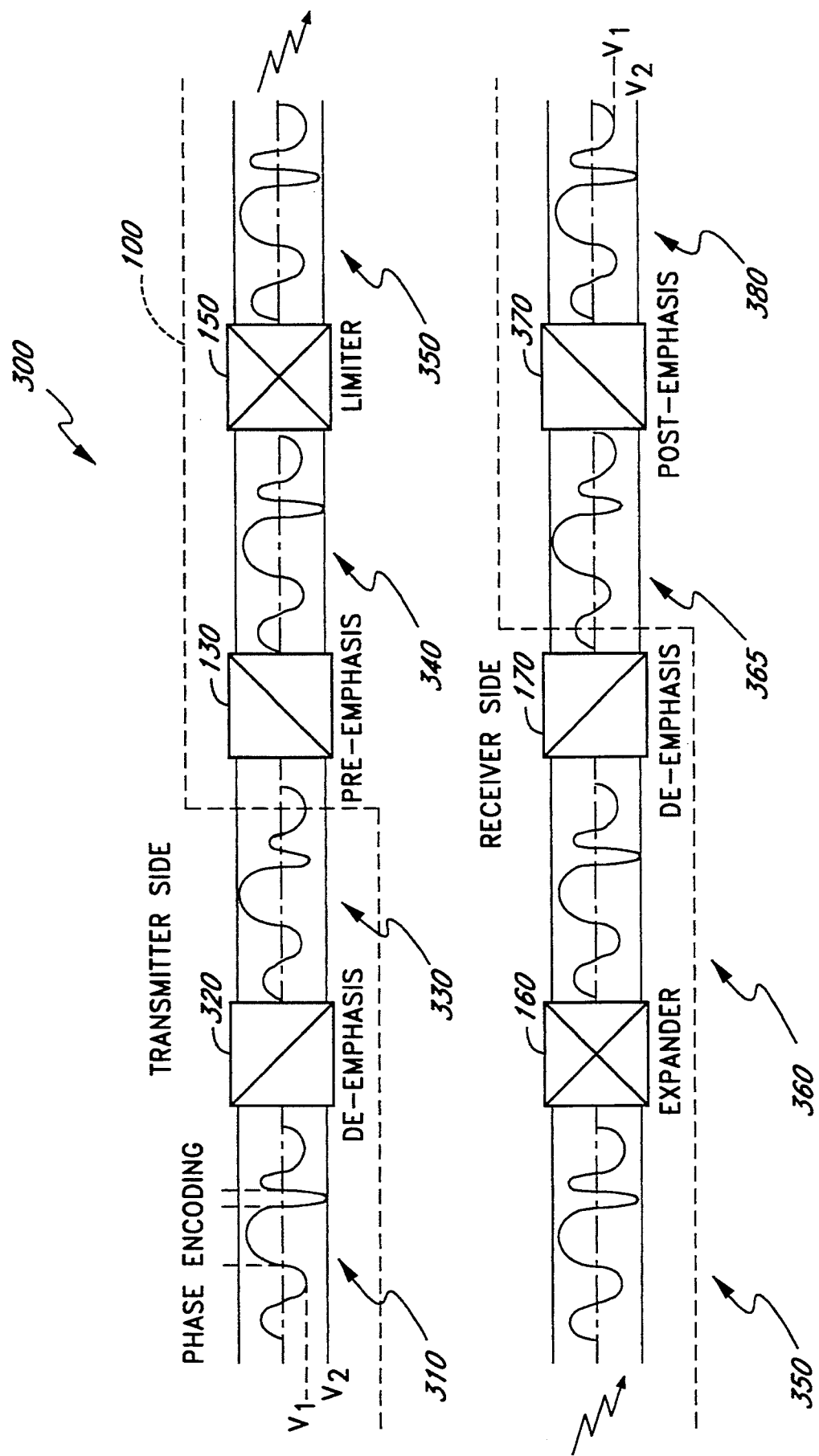
FIG. 4 is a system block diagram schematically showing the waveforms and functional system blocks associated with an improved cellular data transmission system constructed in accordance with the present invention.

FIG. 4 is a schematic representation of an improved cellular data transmission system 300 constructed in accordance with the present invention. The system 300 includes a transmitter end de-emphasizer 320, the pre-emphasis circuit 130, the limiter 150, the expander 160, the receiver end de-emphasizer 170, and a post-emphasizer 370. The pre-emphasis circuit 130, the limiter 150, the expander 160, and the de-emphasizer 170 are the same elements that formed part of the cellular transmission system 100 shown in FIG. 1.

Because data information signals, unlike voice information signals, typically do not have sudden amplitude variations, the gain of the limiter circuit 150 can be held constant during data transmission so that there is no amplitude distortion introduced by the limiter 150. As will be described with reference to FIG. 4, one method of effectively maintaining a constant gain of the limiter 150 is to cancel the pre-emphasis provided by the pre-emphasis circuit 130. The effects of the de-emphasizer 170 are also offset to restore the original signal.

A data communication signal 310, which is encoded by phase and amplitude modulation techniques (or another combination as discussed above with reference to the signal 110), enters the transmitting end de-emphasis circuit 320. In one embodiment, the spectral shaping characteristics of the de-emphasis circuit 320 are such that the high frequency components of the signal 310 are attenuated at a rate of 6 dB/octave to offset the gain of the pre-emphasis circuit 130 that is imposed in accordance with the cellular industry standard. For example, a 1 kHz frequency component would be attenuated by 6 dB more than a 500 Hz frequency component, while a 2 kHz frequency component would be attenuated by 6 dB more than the 1 kHz frequency component. The output of the de-emphasis circuit 320 is represented by a signal 330, having an attenuated high frequency component. The signal 330 enters the pre-emphasis circuit 130 which has spectral shaping characteristics which are complementary to the characteristics of the de-emphasis circuit 320. That is, the pre-emphasis circuit 130 amplifies the high frequency components of the input signal 330 at a rate of 6 dB/octave, so that a 1 kHz frequency component would be amplified by 6 dB more than a 500 Hz frequency component and so on. Therefore, a signal 340 output from the pre-emphasis circuit 130 has substantially the same amplitude characteristics as the original signal 310 input to the de-emphasis circuit 320.

The signal 340 enters the input of the limiter 150. Because the maximum amplitude of the original signal 310 is normally less than or equal to the maximum amplitude threshold allowed by the limiter 150, the limiter 150 does not clip or attenuate the incoming signal 340. Rather, the signal 340 is allowed to pass through the limiter 150 so that the dynamic range of the signal 340 is compressed, without clipping any portion of the signal 340. A signal 350 represents the output of the limiter 150.

The signal 350 is then modulated onto a carrier, and transmitted to a receiver side of the system 300, as is well understood in the art. Assuming that the transmission of the signal 350 to the receiver side and the detection of the signal 350 at the receiver side introduces no significant amplitude or phase distortion, substantially the same signal 350 enters the expander 160 as shown in the lower portion of FIG. 4. The expander 160 expands the dynamic range of the signal 350 so that the amplitude characteristics of a signal 360 output from the expander 160 are substantially the same as the amplitude characteristics of the signal 340 input to the limiter 150. The signal 360 subsequently enters the receiver end de-emphasis circuit 170. The de-emphasis circuit 170 advantageously has similar spectral shaping characteristics to the de-emphasis circuit 320, since the de-emphasis circuit 170 performs complementary operations to the pre-emphasis circuit 130. The de-emphasis circuit 170 outputs a signal 365 which has attenuated high frequency components. Finally, the signal 365 enters a post-emphasis circuit 370, which performs the function of reversing the effects on the signal 365 due to the receiver end de-emphasis circuit 170. Thus, like the pre-emphasis circuit 130, the post-emphasis circuit 370 amplifies the incoming signal at a rate of 6 dB/octave. Therefore, a signal 380, output by the post-emphasis circuit 370 has substantially the same amplitude characteristics as the signals 360 and 340, and thereby, as the original input signal 310. Therefore, the improved cellular data transmission system 300 provides for accurate amplitude discrimination of transmitted signals so that both the amplitude and phase characteristics of the transmitted signal are preserved.

It should be noted that the cancellation of the spectral shaping performed by the pre-emphasis circuit 130 and the de-emphasis circuit 170 results in a reduced signal to noise ratio within the high frequency components of the received signal. However, the increased hissing noise found at the high frequency end, although sometimes bothersome when listening to a voice communication, does not significantly interfere with data transmission.

Although the operation of the improved cellular data transmission system 300 has been described as a unidirectional communication system, it should be understood than an actual implementation of the system 300 is preferably in full duplex to allow simultaneous bi-directional communication. Thus, each side of the system 300 will have all of the components shown in FIG. 4 since each side will carry out both transmitting and receiving operations.

In order to implement the improved cellular transmission system 300, it is merely required to add the de-emphasis circuit 320 to the transmitter side, and the post-emphasis circuit 370 to the receiver side of the conventional cellular transmission system 100 already in place. Of course, since the system 300 is bi-directional, both the de-emphasis circuit 320 and the post-emphasis circuit 370 are preferably implemented on each end in series with the signal path.

Figure 5A:
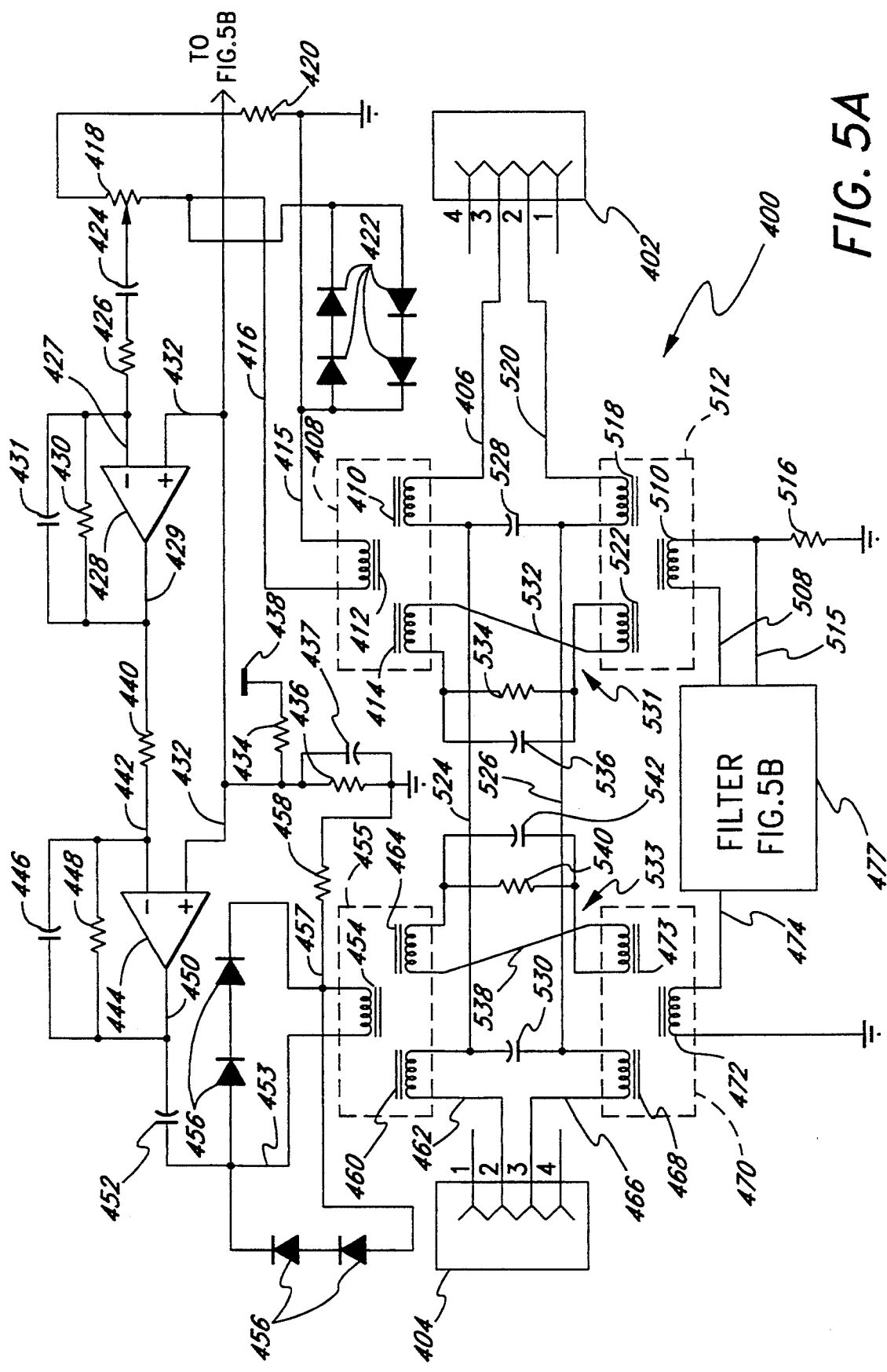
FIGS. 5A and 5B are schematic diagrams which detail the specific circuitry used in an actual embodiment of a circuit including both the de-emphasis circuit and the post-emphasis circuit.
Figure 5B:
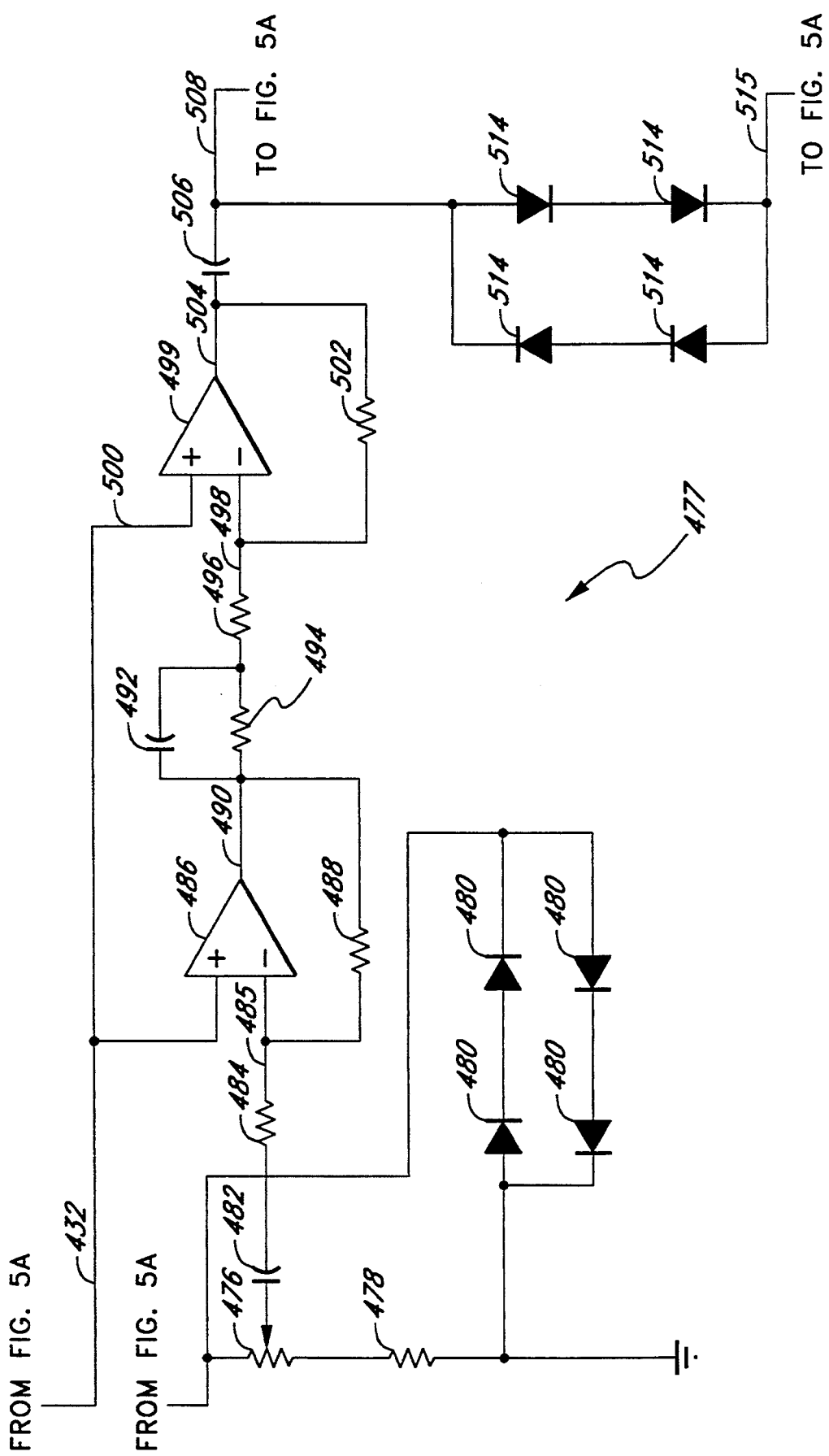
Figure 6:
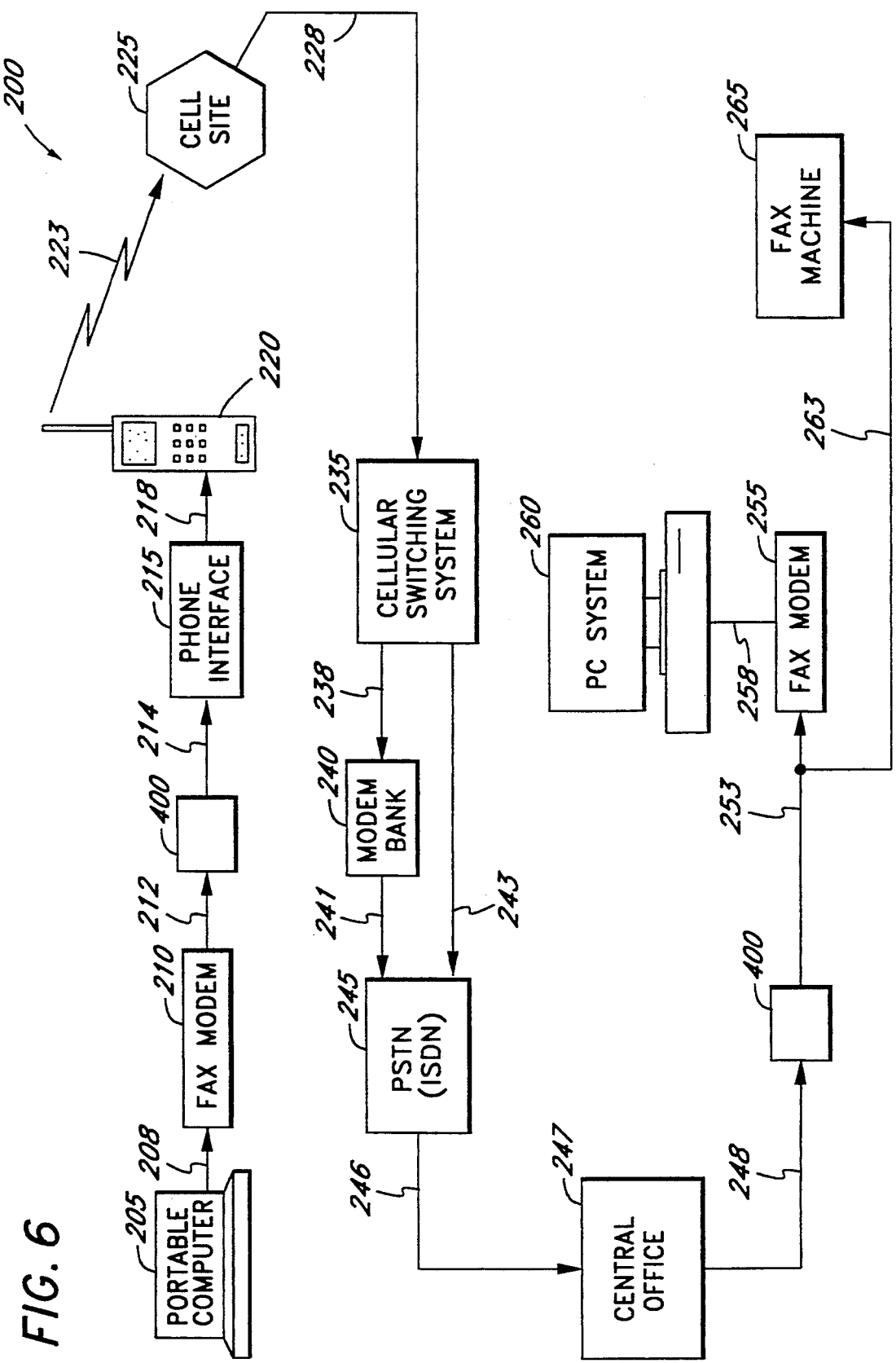
FIG. 6 is a simplified schematic diagram which represents most of the main structural elements of one embodiment of an analog cellular communication system constructed in accordance with the teachings of the present invention.

The Overall Configuration of the De-emphasis/Post-emphasis Circuit Used in One Embodiment of the Invention FIGS. 5A and 5B detail the specific circuitry used in an actual embodiment of a "black box" circuit 400 including both the de-emphasis circuit 320 and the post-emphasis circuit 370. The circuit 400 shown in FIGS. 5A and 5B is advantageously located along the signal path between the FAX modem 210 and the cellular telephone interface 215 as indicated in FIG. 6. Similarly, the complementary circuit on the receiving end (which in the full duplex bi-directional system is the same as the circuit 400 on the transmitting end) is located along the line 248 between the central office 247 and the FAX modem 255, or the facsimile machine 265 (FIG. 6).

Because the circuit 400 is made for bi-directional use, the circuit 400 includes both a de-emphasis circuit portion for outgoing transmission, which will be described first, and a post-emphasis circuit portion for incoming signals, which will be described subsequently.

The circuit shown in FIGS. 5A and 5B includes an input/output jack 402, and an input/output jack 404 which are provided for full duplex bi-directional communication. For purposes of this description, outgoing transmissions (those entering the de-emphasis portion of the circuit 400) will proceed from the jack 402 to the jack 404, while incoming signals (those entering the post-emphasis portion of the circuit 400) will proceed from the jack 404 to the jack 402.

The De-Emphasis Circuit Portion

The input/output jack 402 connects to a coil 410 via an input line 406. The coil 410 is situated within a transformer 408. The transformer 408 may be, for example, a Model NO. TY302P transformer commercially available from MAGNETEC-TRIAD. Such transformers are commercially available from other sources for use in hybrid telephone circuits. The coil 410 couples electrical energy to a coil 412 and also to a coil 414. As will be explained later, the coil 414 is provided for cancellation purposes in a hybrid circuit for special use in full duplex bi-directional communication.

The coil 412 connects to ground on one end via a line 415. The other end of the coil 412 connects to a potentiometer 418 via a line 416. The potentiometer 418 connects to a resistor 420 which in turn connects to ground. In one embodiment, the potentiometer 418 has a maximum resistance of 500 ohms while the resistor 420 has a resistance of 120 ohms. Four voltage regulation diodes 422 are connected in parallel with the voltage divider formed by the potentiometer 418 and the resistor 420. The voltage regulation diodes 422 may, for example, comprise diodes manufactured by National Semiconductor, and others, Part No. 1N4004.

The variable arm, or wiper, of the potentiometer 418 further connects to a capacitor 424 which, in one embodiment, is a 1 microfarad capacitor. The capacitor 424 connects in series with a resistor 426 which may, for example, have a resistance of 18,000 ohms. The resistor 426 connects to the inverting (−) input of an operational amplifier 428. In one actual embodiment, the operational amplifier 428 is sold by National Semiconductor, Motorola, Signetics, and others under Part No. UA1458 or MC1458, for example. A resistor 430 in parallel with a capacitor 431 connects on one end to the inverting (−) input of the amplifier 428 and on the other end, to an output 429 of the amplifier 428. In one embodiment, the resistor 430 has a value of 56,000 ohms, and the capacitor 431 has a value of 680 picofarads. The non-inverting (+) input of the amplifier 428 connects to a bias line 432.

The bias line 432 provides a reference voltage source via a voltage divider circuit comprising a resistor 434, a resistor 436 in parallel with a capacitor 437, and a voltage source 438. As shown in FIG. 5A, the voltage source 438 is a 12-volt voltage source in one embodiment. The resistors 434 and 436 connect between the voltage source 438 and ground, while the bias line 432 connects between the resistors 434 and 436. In one embodiment, the resistors 434 and 436 are both 10,000 ohm resistors, while the capacitor 437 is 1 microfarad, so that the voltage provided on the bias line 432 is approximately +6 volts.

The output 429 of the operational amplifier 428 connects to a resistor 440. The resistor 440 may, for example, have a value of 4,700 ohms. The resistor 440 connects in series with an inverting (−) input 442 of an operational amplifier 444. The non-inverting (+) input of the operational amplifier 444 also connects to the bias line 432. A capacitor 446 and a resistor 448 connect in parallel with one end connected to the inverting (−) input 442 of the amplifier 444 and the other end connected to an output 450 of the amplifier 444. Specific values of the capacitor 446 and resistor 448 may be 0.033 microfarads and 82,000 ohms, respectively. Furthermore, the operational amplifier 444 advantageously is supplied by the same manufacturer and is the same part number as the amplifier 428 and is included within the same IC package.

The output 450 of the amplifier 444 connects in series with a capacitor 452. The capacitor 452 may, for example, be a 1 microfarad capacitor. The capacitor 452 connects to a coil 454 via a line 453. The coil 454 is situated within a transformer 455 which is advantageously supplied by the same manufacturer under the same part number as the transformer 408. Voltage regulation diodes 456 connect in parallel across the coil 454. The coil 454 connects to a resistor 458 via a line 457. The resistor 458 in turn connects to ground. The resistor 458 may, in one embodiment, have a value of 620 ohms.

The coil 454 couples electromagnetic energy to a coil 460. The coil 460 connects to the input/output jack 404 via an output line 462. The coil 454 further couples electromagnetic energy to a coil 464 within the transformer 455. Energy coupled to the coil 464 serves to cancel unwanted signals which frequently occur in full duplex bi-directional operation as will be explained further below.

The circuit connected between the input line 406 and the output line 462, as described and depicted in FIG. 5A, comprises one specific embodiment of a de-emphasis circuit which de-emphasizes high frequencies at a rate of 6 dB/octave. That is, this portion of the circuit provides a low-pass filter with a fall-off rate of 6 dB/octave and corresponds to the block 320 in FIG. 4.

The Post Emphasis Circuit Portion

Received data is input into the input/output jack 404 and passes through a post-emphasis circuit portion of the circuit 400 as described immediately hereafter. The jack 404 connects to an input line 466 which serves as an input to a coil 468. The coil 468 is situated within a transformer 470 which is advantageously supplied by the same manufacturer under the same part number as the transformers 455 and 408. The coil 468 couples electrical energy to a coil 472 and a coil 473, both within the transformer 470. As with the coils 464 and 414, the coil 473 is provided for cancellation purposes within a hybrid circuit for full duplex bi-directional communications.

One end of the coil 472 connects to ground while the other end of the coil 472 connects to a potentiometer 476 in a filter circuit 477 (shown in FIG. 5B) via a line 474. The potentiometer 476 is a variable resistor which has a maximum resistance of 500 ohms in one embodiment. The potentiometer 476 further connects in series with a resistor 478 which in turn connects to ground. The resistance of the resistor 478 may, for example, be 120 ohms. Four voltage regulation diodes 480 connect in parallel with the voltage divider formed by the resistor 478 and the potentiometer 476. The variable arm, or wiper, of the potentiometer 476 connects to a capacitor 482, which in one embodiment may have a value of 1 microfarad. The capacitor 482 connects in series with a resistor 484 which may, for example, have a value of 18,000 ohms. The resistor 484 connects to an inverting (−) input 485 of an operational amplifier 486. The operational amplifier 486 advantageously is supplied by the same manufacture under the same part number as the operational amplifiers 444 and 428. The non-inverting (+) input of the operational amplifier 486 connects to the bias line 432 connected to non-inverting (+) input of the operational amplifier 444 in FIG. 5A. A resistor 488, having an exemplary value of 56,000 ohms, connects on one end to the inverting (−) input 485 and on the other end, to an output 490 of the operational amplifier 486.

A capacitor 492 and a resistor 494 which have exemplary values of 0.022 microfarads and 30,000 ohms, respectively, are connected in parallel between the output 490 of the amplifier 486 and a resistor 496. The resistor 496 has, in one embodiment, a resistance of 1,000 ohms.

The resistor 496 connects to an inverting (−) input 498 of an operational amplifier 499. The non-inverting (+) input of the operational amplifier 499 connects to the bias line 432. A resistor 502 connects between the inverting (−) input 498 of the operational amplifier 499 and an output 504 of the operational amplifier 499. In one embodiment, the resistor 502 has a resistance of 43,000 ohms. The output 504 of the operational amplifier 499 connects to a capacitor 506 having an exemplary value of 1 microfarad. The capacitor 506 connects to a coil 510 in FIG. 5A via a line 508. The coil 510 is situated within a transformer 512 which is supplied by the same manufacturer under the same part number as the transformers 408, 455 and 470. Four voltage regulation diodes 514 (FIG. 5B) connect in parallel across the terminals of the coil 510 via the line 508 and a line 515. A resistor 516, having an exemplary value of 620 ohms, connects between the line 515 and ground.

The coil 510 couples electrical energy to a coil 518 within the transformer 512 which in turn connects to an output line 520 connected to the input/output jack 402. The coil 510 also couples electrical energy to a coil 522 within the transformer 512 for cancellation purposes.

The circuit connected between the input line 466 and the output line 520 serves as a post-emphasis circuit which amplifies high frequencies at a rate of 6 dB/octave. That is, the circuit between the input line 466 and the output line 520, which corresponds to the post-emphasis circuit 370 shown in FIG. 4, is an active high-pass filter which provides a constant amplification as a function of frequency with a positive slope of 6 dB/octave.

In order to provide a DC path for the hook switch of an externally connected modem, as well as a low frequency path for ring voltage, the coil 410 connects to the coil 460 via a line 524, while the coil 518 connects to the coil 468 via a line 526. Furthermore, a capacitor 528 and a capacitor 530 each having values, for example, of 4.7 microfarads, connect in parallel between the lines 524 and 526.

The Hybrid Circuits

Because the disclosed system operates as a full duplex bi-directional communication system, it is necessary to provide interference cross signal canceling via conventional 2 to 4 wire splitter, or hybrid, circuits 531, 533. The transformers 408 and 512 are included within the hybrid circuit 531, while the transformers 455 and 470 are included within the hybrid circuit 533. In the hybrid circuit 531, the coil 522 connects to the coil 414 via a line 532. Between the opposite terminals of the coils 414 and 522, a capacitor 536 having an exemplary value of 0.015 microfarads and a resistor 534 having an exemplary value of 620 ohms are connected in parallel. In a similar fashion within the hybrid circuit 533, the coil 473 connects to the coil 464 via a line 538. A capacitor 542 having an exemplary value of 0.015 microfarads and a resistor 540 having an exemplary value of 620 ohms are connected in parallel between the other terminals of the coils 464 and 473.

Operation of the De-emphasis Portion of the Circuit 400

In operation, a communication signal input to the input/output jack 402 onto the input line 406 enters the coil 410 and is coupled to the coil 412 so that substantially the same communication signal is present on the line 416. The signal is then voltage divided by the potentiometer 418 and the resistor 420 so that some fraction of the signal on the line 416 is present on the output of the variable arm of the potentiometer 418. Thus, by varying the position of the wiper arm of the potentiometer 418, the overall system gain may be linearly attenuated. The signal passes through the coupling capacitor 424 and the bias resistor 426, and enters a buffer amplifier comprising the amplifier 428, the resistor 430, and the capacitor 431. The buffer amplifier amplifies the input signal.

The output of the buffer amplifier on the line 429 enters into a low pass filter formed by the resistor 440, the amplifier 444, the resistor 448, and the capacitor 446. This low pass filter provides a 6 dB/octave roll-off. As is well understood in the art, the overall gain of the amplifier 444 is set by the ratio of the feedback impedance provided by the resistor 448 and the capacitor 446 to the input resistance provided by the resistor 440. As the frequency increases, the capacitive reactance provided by the capacitor 446 decreases, thereby reducing the ratio of the impedance provided by the capacitor 446 and the resistor 448 to the input resistor 440. The values of the capacitor 446, the resistor 448, and the resistor 440 are chosen specifically so as to provide a gain reduction rate of 6 dB/octave of frequency.

The output of the low pass filter on the line 450 is coupled through the coupling capacitor 452 and enters the coil 454. The signal present on the coil 454 is coupled to the coil 460 and thereby transferred to the output line 462 to be received at the input/output jack 404.

The diodes 422 are connected in parallel across the input of the de-emphasis portion of the circuit in order to provide voltage regulation and thereby protect the circuit input from sudden voltage spikes, etc. Similarly, the diodes 456 which are connected in parallel with the coil 454 also serve as voltage regulators to protect the coil 454 from sudden voltage spikes, etc. The resistor 458 provides a resistance which provides a 620 ohm load to the hybrid circuit 533.

Operation of the Post-emphasis Portion of the Circuit 400

Signals input to the jack 404 onto the input line 466 are post-emphasized and output to the jack 402 on the output line 520. A signal input on the line 466 is coupled to the line 474 through the mediation of the transformer coils 468 and 472. The signal on the line 474 is voltage divided across the resistor 478 and the potentiometer 476. Thus, the signal output on the variable arm of the potentiometer 476 is a linearly scaled version of the signal on the line 474. The ratio between the signal on the variable arm of the potentiometer 476 may be varied by varying the position of the wiper arm of the potentiometer 476. Thus, the voltage divider formed by the resistor 478 and the potentiometer 476 is able to alter the overall gain of the post-emphasis circuit.

The signal on the variable arm of the potentiometer 476 is coupled through the coupling capacitor 482 to the bias resistor 484. The signal then passes through the bias resistor 484 to the input of a buffer amplifier formed by the amplifier 486 and the resistor 488. As with the buffer amplifier formed by the amplifier 428 and the resistor 430, the purpose of the buffer amplifier formed by the amplifier 486 and the resistor 488 is to amplify the input signal.

Furthermore, the buffer amplifier formed by the resistor 488 and the amplifier 486 provides a uniform impedance for the hybrid circuit 531. This is because the impedance of the input circuit to the next amplifier stage (i.e., the amplifier 499) is frequency dependant due to the parallel capacitor 492. At very high frequencies, the impedance of the input circuit of the amplifier 499 is approximately 1,000 ohms, while at very low frequencies, the input impedance is approximately 31,000 ohms. By placing the buffer amplifier formed by the resistor 488 and the amplifier 486 between the hybrid circuit 531 and the input circuit to the amplifier 499, a more uniform impedance is seen by the hybrid circuit 531.

The output signal from the buffer amplifier on the line 490 enters a high pass filter formed by the capacitor 492, the resistor 494, the resistor 496, the resistor 502 and the amplifier 499. The gain of the amplifier 499 is set by the ratio of the value of the resistor 502 to the input impedance provided by the value of the resistor 496 in combination with the impedance produced by the parallel connection of the capacitor 492 and the resistor 494. As the input frequency is increased, the capacitive reactance of the capacitor 492 decreases. Therefore, the overall ratio of the resistor 502 to the input impedance provided by the resistor 496, the capacitor 492, and the resistor 494 increases with the frequency with an absolute limit of 43 to 1 (i.e., the ratio of the value of the resistor 502 to the value of the resistor 496). The values of the resistor 496, the resistor 502, the resistor 494, and the capacitor 492 are selected to provide a gain increase rate of 6 dB/octave of frequency.

The output of the high pass filter on the line 504 is coupled through the coupling capacitor 506 to the line 508. The signal on the line 508 is fed to the output line 520 and subsequently to the jack 402 through the mediation of the transformer coils 510 and 518.

Operation of the Hybrid Circuits

As stated above, the transformers 408 and 512, the capacitor 536, and the resistor 534, as well as the transformers 455 and 470, the resistor 540, and the capacitor 542, comprise the hybrid cancellation circuits 531, 533 which allow for simultaneous bi-directional communication through the circuit 400. In the hybrid circuit 531, a communication signal present in the coil 518 will also couple to the coil 410 via the capacitor 528, as well as through the modem which is externally connected to the jack 402. Thus, the signal on the coil 410 is a composite of both the desired signal input on the input line 406, and the interference signal on the output line 520. In order to prevent the interference component of the signal from being coupled to the coil 412, the hybrid circuit 531 is provided.

As noted above, the signals present on the coil 518 are coupled to the coil 522. This signal on the coil 522 is then coupled to the coil 414 via the capacitor 536 and the resistor 534 so that the signal present on the coil 414 is 180° out of phase with the signal present on the coil 522. Thus, the signal present on the output line 520 is present both in the coil 410, as well as in the coil 414, so that the signal on the coil 414 is 180° out of phase with the signal on the coil 410.

The inverted signal present on the coil 414 interacts with the signal present on the coil 410 to cancel that component of the signal present on the coil 410 which is caused by the signal on the output line 520. The values of the capacitor 536, the resistor 534 and the capacitor 528, as well as the number of turns in the winding of the coil 522, are chosen to insure that the amplitude of the signals present on the coil 410 and the coil 414 are equal and opposite so that the interfering component of the signal present on the coil 410 is substantially canceled by the signal present on the coil 414. As is well understood in the art, the values of the capacitor 536 and the resistor 534 are typically chosen to balance the impedance of an externally connected modem connected to the jack 402. Because the interference signal present on the coil 410 is substantially canceled, the signals input to the coil 510 are coupled via the coil 518 to the output line 520, but are not coupled to the coil 412 due to the cancellation provided by the coil 414.

In a similar fashion, within the hybrid circuit 533, signals present on the coil 454 are coupled to the output line 462 via the coil 460. The signal present on the output line 462 is also coupled to the coil 468 via the capacitor 530 and via a telephone line connected to the jack 404. Therefore, in addition to the desired input signal provided to the coil 468 via the input line 466, an undesired interference signal is also coupled to the coil 468. However, in a manner similar to that described immediately above, signals present on the coil 473 serve to cancel any interference component of the signal present on the coil 468, so that only the desired input signal is coupled to the coil 472 and thereby passed through the post-emphasis portion of the circuit 400.

The Modem Internal Compensation Circuit

Figure 7:
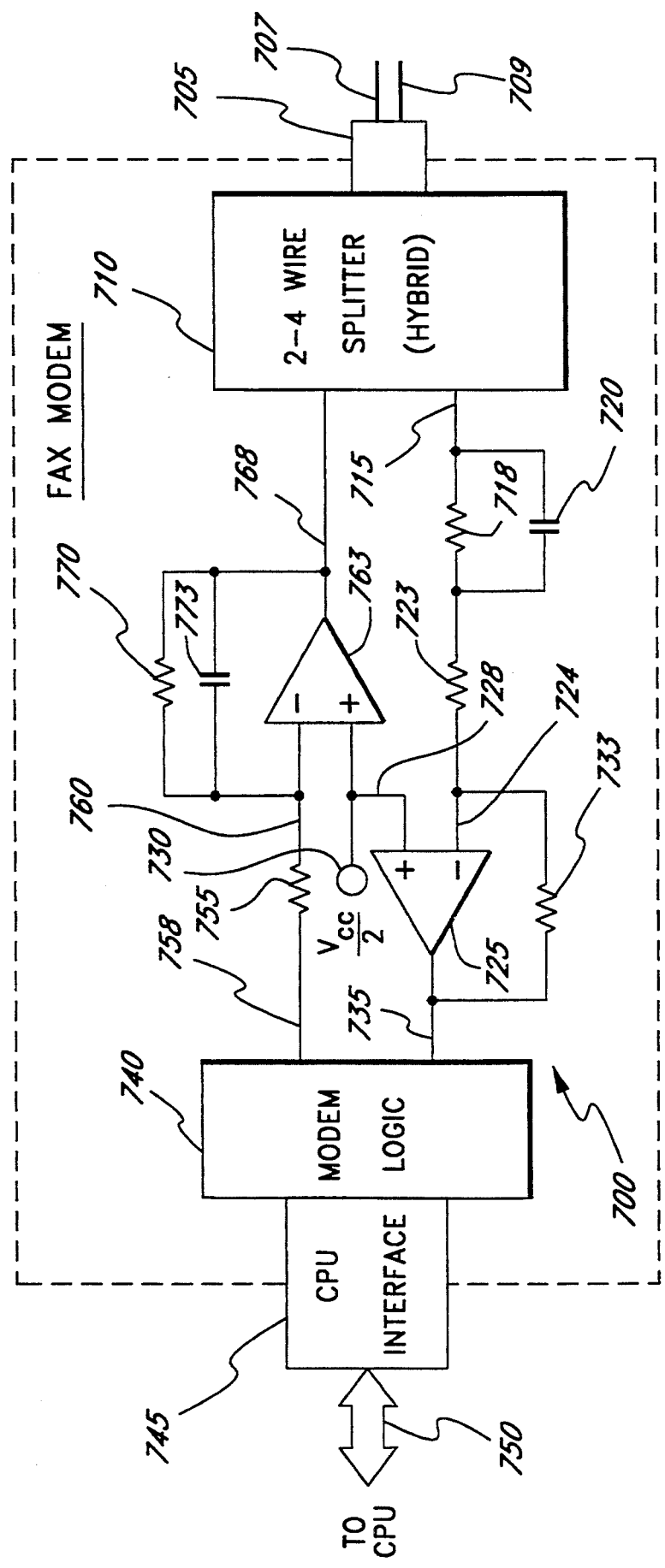
FIG. 7 is a schematic diagram which shows the internal circuitry of a modem as altered in accordance with one embodiment of the present invention.

FIG. 7 is a schematic diagram of a de-emphasis/post-emphasis circuit 700 as implemented internally within the FAX modem 210 and, complementarily, within the FAX modem 255. The circuit 700 is a somewhat simplified version of the circuit 400, and performs essentially the same functions of post-emphasizing incoming signals and de-emphasizing outgoing signals.

Data signals are input to the circuit 700 via a jack 705 having input/output lines 707,709. The jack 705 connects to a 2-4 wire splitter, or hybrid circuit 710 (designated generally as a box in FIG. 7). The hybrid circuit 710, like the hybrid circuits 531 and 533 is well known in the art, and all description relating to the connection and operation of the hybrid circuits 531, 533 apply equally to the hybrid circuit 710. The hybrid circuit 710 connects to the input of the post-emphasis portion of the circuit 700 via a line 715, which connects to a resistor 718 in parallel with a capacitor 720. The resistor 718 and the capacitor 720 connect to a resistor 723, which in turn connects to an inverting (−) input 724 of an operational amplifier 725. A non-inverting (+) input 728 of the amplifier 725 connects to a voltage source 730 which provides a bias voltage.

A resistor 733 connects between the inverting input 724 of the amplifier 725 to an output 735 of the amplifier 725. The output 735 of the amplifier 725 connects to conventional modem logic (designated generally by a box 740 in FIG. 7). The modem logic 740 connects to a CPU interface 745, which in turn connects to a CPU bus 750. the modem logic 740, the CPU interface 745, and the CPU bus 750 are all standard and are already provided within the FAX modems 210, 255.

The modem logic 740 connects to the input of the de-emphasizing portion of the circuit 700 via a line 758 which connects to a resistor 755. The resistor 755 connects to an inverting (−) input 760 of an operational amplifier 763. the operational amplifier is advantageously included within the same IC package as the amplifier 725. A non-inverting (+) input 765 of the amplifier 763 connects to the voltage source 730.

A resistor 770 and a capacitor 773 connect in parallel across the inverting input 760 of the amplifier 763 and an output 768 of the amplifier 763. The output 768 of the amplifier 763 connects to the hybrid circuit 710, and, through it, to the jack 705.

The particular values of the elements of the circuit 700 may vary from modem to modem, as will be appreciated by one of ordinary skill in the art. It should be noted that, other than the capacitors 720, 773, the circuit 700 as shown in FIG. 7 is already provided within a conventional FAX modem. In order to implement this embodiment of the present invention, therefore, one need simply add the capacitors 720, 773, and change the resistance values of some of the resistive elements (e.g., the resistors 733, 718, and 770).

In operation, an input data signal is split through the hybrid circuit 710 and is provided as an input to the post-emphasis portion of the circuit 700. Due to the connection of the capacitor 720 at the input 724 of the amplifier 725, the gain of the amplifier stage varies directly with frequency. In a preferred embodiment, the values of the resistor 718, the resistor 733, and the capacitor 720 are chosen to provide a 6 dB/octave gain.

Data signals going out of the FAX modem are provided as inputs to the de-emphasis portion of the circuit 700 from the modem logic 740. Due to the capacitor 773 the gain of the amplifier stage 763 varies inversely as a function of frequency. In a preferred embodiment, the values of the resistor 755, the resistor 770, and the capacitor 773 are chosen to provide a 6 dB/octave roll-off.

Thus, a de-emphasis/post-emphasis circuit implemented internally within a FAX modem on both the transmitting and receiving ends provides the same offsetting effects as the externally implemented circuit 400. By this means, the amplitude distortion introduced by the limiter circuit 150 is reduced significantly, as discussed above with reference to FIGS. 4, and 5A and 5B.

In a further embodiment (not shown) of the invention, substantially the same de-emphasis/post-emphasis compensation circuitry 700 can be advantageously implemented within the telephone interface 215 (FIG. 7), which has a 4-wire interface with the cellular telephone 220 and a 2-wire interface with the Fax modem 210.

The Pilot Signal System

Another system and method which can advantageously be used to keep the gain of the limiter 150 constant involves the introduction of a constant frequency, constant amplitude pilot tone signal at the high frequency end of the transmitted data signal. Because the pilot signal initially has a higher amplitude than the data signals to be transmitted and has a frequency greater than the highest frequency within a data transmission, a pre-emphasizer will amplify it the most so that it is always the highest amplitude signal detected by the limiter 150. Thus, the limiter 150 always adjusts its gain by the amplitude of the pilot signal (which is constant throughout). Therefore, the gain of the limiter is always kept constant. At the receiving end, the pilot signal is easily filtered out of the data signal using a high Q notch filter since the pilot signal always maintains a constant frequency and is at the edge of the transmitted frequency range. The use of a notch filter is especially advantageous in preventing phase distortion often associated with low-pass filters. A more detailed description of the pilot signal embodiment of the invention is provided with reference to FIG. 8.

Figure 8:
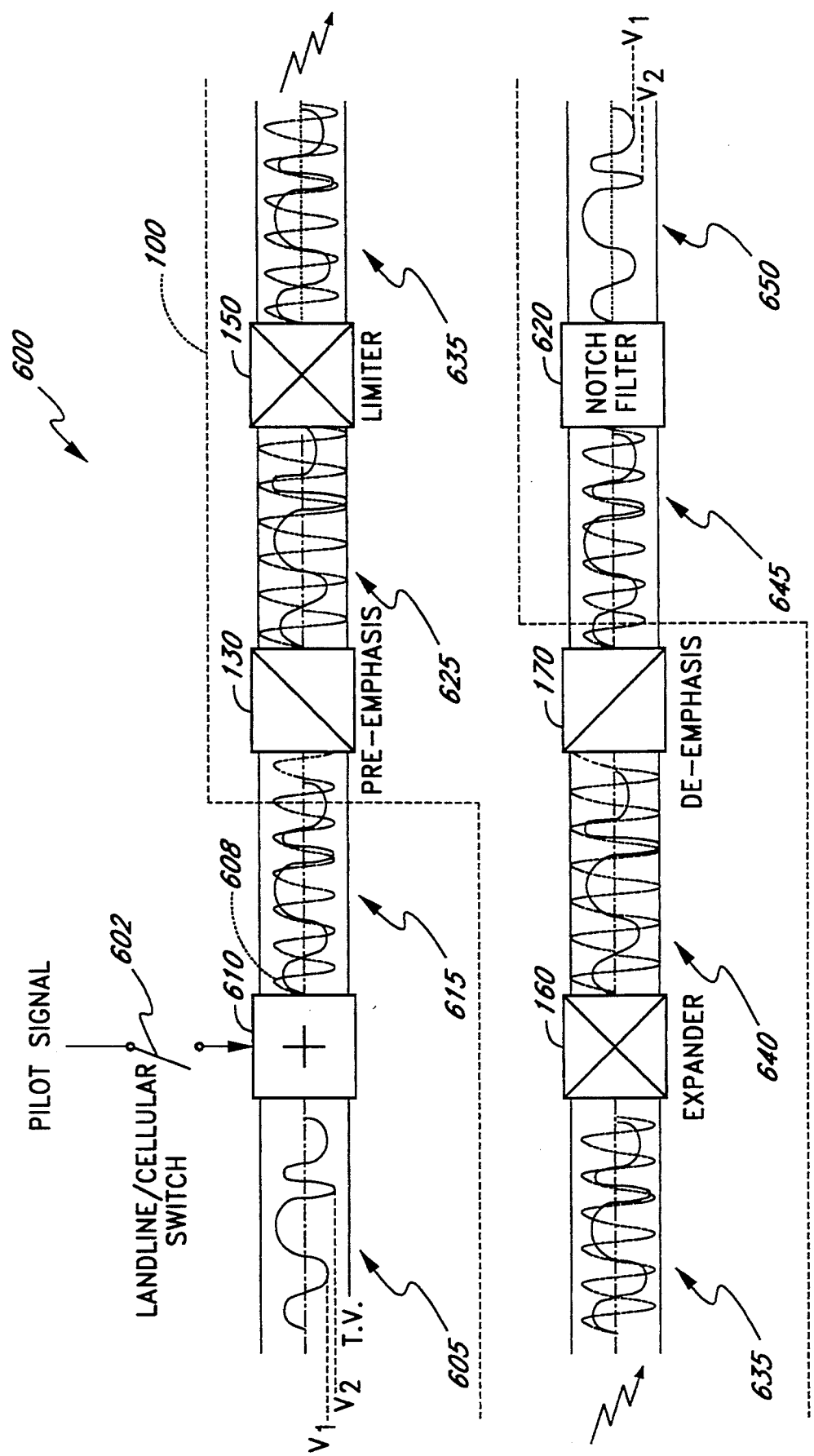
FIG. 8 is a system block diagram schematically showing the waveforms and functional system blocks associated with a pilot signal embodiment of the present invention.

FIG. 8 is a system block diagram schematically showing the waveforms into and out of each main functional block of a cellular transmission system 600. The system 600 is one embodiment of an improved analog cellular transmission system constructed in accordance with the teachings of the present invention. The system 600 uses a pilot signal to keep the gain of the limiter 150 constant throughout transmission when enabled by a switch 602, for example, when data is transmitted. As is the case with the system 300, the system 600 is advantageously implemented with the already existing conventional transmit/receive system 100 (including the pre-emphasis circuit 130, the limiter 150, the expander 160, and the de-emphasis circuit 170). Thus, the system 600 may be retroactively implemented with most existing analog cellular communication systems.

The system 600 includes a pilot signal combiner circuit 610 on the transmitter side, and a notch filter 620 on the receiver side. The pre-emphasis circuit 130, the limiter 150, the expander circuit 160, and the de-emphasis circuit 170 are interposed between the combiner circuit 610 and the notch filter 620. A data signal 605 encoded by means of both amplitude and phase modulation techniques (or by other combinations as discussed above) enters the pilot signal combiner circuit 610 which combines a generated pilot signal 608 with the data signal 605 to form a composite output signal 615. It should be understood that, although the pilot signal component 608 of the composite signals is shown as a separate signal in FIG. 8, in actuality the signals combine to form one composite signal. For ease of conceptualization, and for purposes of the following description, however, it is advantageous to represent both the data and pilot signal components of each of the composite signals separately. The characteristics of the generated pilot signal 608 are such that the amplitude of the pilot signal is always greater than or equal to the maximum amplitude of the incoming data signal 605, and the frequency of the pilot signal 608 is always greater than the maximum frequency of the data signal 605. In one preferred embodiment, the frequency of the pilot signal 608 is approximately 3.4 kHz (i.e., just above the maximum frequency which the data signal 605 would normally attain).

The signal 615 enters the pre-emphasis circuit 130 wherein the higher frequency components of the waveform 615 are amplified at a gain of 6 dB/octave. Because the pilot signal 608 was initially chosen to have a frequency which is greater than the frequency of the data signal, the pilot signal component of the waveform 615 will be amplified the most, while the high frequency components of the waveform 615 due to the data signal are amplified somewhat less, as depicted in the waveform 625 output from the pre-emphasis circuit 130.

Because the amplitude of the pilot signal 608 before entering the pre-emphasis circuit 130 is always greater than or equal to the amplitude of the data signal 605, and the pilot signal component of the waveform 615 is amplified the most in the pre-emphasis circuit 130, it follows that the pilot signal component of the waveform 625 will always have an amplitude which is greater than or equal to the amplitude of any data components of the signal 625.

The signal 625 enters the limiter 150 which has a gain setting that is dependent upon the maximum voltage amplitude of the input signal 625. Since the pilot signal component of the signal 625 always has the greatest amplitude, the gain of the limiter 150 is always set by the amplitude of the pilot signal component. Thus, the amplitude of the pilot signal component is set such that the other data components of the signal 625 are compressed by a constant compression factor as shown in a signal 635 output from the limiter 150.

It is an important aspect of this embodiment of the invention that the amplitude of the pilot signal component of the signal 625 is kept constant throughout transmission. This is because the gain of the limiter 150 must be kept constant to prevent data signal amplitude distortion, and the limiter gain depends upon, and varies directly with, the amplitude of the pilot signal component of the signal 625. In accordance with the present invention, the amplitude of the pilot signal component of the signal 625 always remains constant since the original pilot signal 608 has a constant input voltage and a constant frequency. The constant frequency of the pilot signal 608 insures that the pilot signal component of the signal 615 is always amplified by the same gain in the pre-emphasis circuit 130. Thus, a constant input voltage increased by a constant gain results in a constant output voltage so that the pilot signal component of the signal 625 is kept constant. As a result, the gain of the limiter is fixed throughout data transmission. This is particularly advantageous for purposes of eliminating amplitude distortion caused by the limiter 150 and exacerbated by the prolonged recovery time of the limiter 150, since a constant gain setting requires no recovery.

The signal 635 is modulated onto a carrier, as is well known in the art, and is transmitted to the receiver end of the cellular communication system 600. At the receiver end, the signal 635 enters the expander circuit 160 which expands the dynamic range of the signal 635 back to normal. Thus, assuming accurate detection from the carrier, a signal 640 output from the expander 160 has substantially the same amplitude characteristics as the signal 625 input to the limiter 150.

The signal 640 enters the de-emphasis circuit 170, which de-emphasizes the high frequency components of the signal 640 so that the proportion between the data component of the signal 640 and the pilot signal component of the signal 640 is the same as that exhibited in the signal 615 (before pre-emphasis). The output of the de-emphasis circuit 170 is represented by a signal 645.

The signal 645 enters the notch filter 620. The characteristics of the notch filter 620 are determined so that the high frequency pilot signal component of the signal 645 is completely or nearly removed. Thus, it is advantageous for the notch filter to have a very sharp roll-off just below the frequency of the pilot signal component. In one embodiment, the gain of the notch filter 620 at the pilot signal frequency is approximately −40 dB, and no higher than −25 dB, while the gain in the frequency band which includes the data signal component is approximately 0 dB, and no less than −6 dB. Therefore, the output of the notch filter 620 is merely the data component of the signal 640, as shown by signal 650. Because clipping in the limiter 150 is avoided, and the recovery time of the limiter 150 does not introduce distortion, the output signal 650 has substantially the same amplitude characteristics as the input data signal 605. Thus, the pilot signal embodiment of the present invention allows accurate amplitude discrimination when used in conjunction with an analog cellular communication system.

The pilot tone may be introduced at several locations within the conventional analog cellular communication system 200 depicted in FIG. 2. For example, the pilot tone may be introduced within the FAX modem 210, the telephone interface 215, or along the line 212, between the FAX modem 210 and the telephone interface 215. Likewise, the notch filter 620 may be implemented along the line 253, or within the FAX modem 255, for example.

One skilled in the art will recognize that the teachings of the present invention may be embodied in a variety of different ways according to the specific application without departing from the essence and spirit of the invention. For example, although the present invention has been described primarily with reference to an analog cellular communication system, the teachings of the present invention apply broadly to most or all radio frequency communication systems which include pre-emphasis and limiting functions. In addition, a processor within the modem bank 240, or other digital processing devices, may analyze the received signal and perform digital signal processing in accordance with the known characteristics of the limiter 150 so as to compensate for distortion introduced by the limiter 150. Furthermore, the pre-emphasis circuit within the cellular telephone 220, and the de-emphasis circuit within the cell site 225 could be deactivated. Also the structure or programming of the limiter 150 could be modified to maintain a constant gain level. Therefore, it will be understood that the foregoing description is merely illustrative and not restrictive. Rather the spirit and scope of the invention should be interpreted in light of the appended claims.

We claim:

1. An apparatus for increasing the data output rate from a transmit modem in a duplex analog radio communications system having a single-carrier data signal, comprising:

a radio transmitter which receives said single-carrier data signal, said radio transmitter including a pre-emphasizer that increases the amplitudes of components of said single-carrier data signal in the range of 1,000 Hz to 3,000 Hz, said radio transmitter further including a limiter that limits the amplitudes of said single-carrier data signal;

a transmit modem which provides said single-carrier data signal as an input signal to said radio transmitter, said transmit modem encoding digital data onto said input signal as a plurality of modulation signal components including higher frequency modulation signal components and lower frequency modulation signal components; and a de-emphasizer which selectively reduces the amplitudes of said higher frequency modulation signal components of said input signal relative to amplitudes of said lower frequency modulation signal components of said input signal to reduce the effect of said limiter on said input signal.

2. An apparatus for increasing the data output rate from a transmit modem in a duplex analog radio communication system having a single-carrier data signal, comprising:

a radio transmitter which receives said single-carrier data signal, said radio transmitter including a pre-emphasizer that increases the amplitudes of components of said single-carrier data signal in the range of 1,000 Hz to 3,000 Hz, said radio transmitter further including a limiter that limits the amplitudes of said single-carrier data signal;

a transmit modem which provides said single-carrier data signal as an input signal to said radio transmitter, said transmit modem encoding digital data onto said input signal as a plurality of modulation signal components, said transmit modem including a spectral shaper which selectively reduces amplitudes of said modulation signal components at higher frequencies to cause said input signal from said modem to said radio transmitter to have lower amplitudes at higher frequencies than at lower frequencies to reduce the effect of said limiter on said input signal.

* * * * *